(No Model.)

A. A. & H. C. KUPFER.
BICYCLE TIRE.

No. 481,038. Patented Aug. 16, 1892.

WITNESSES:
Chas. H. Luther Jr
Henry J. Miller

INVENTORS
Arthur A. Kupfer and
Herman C. Kupfer
by Joseph A. Miller & Co.
Attys.

UNITED STATES PATENT OFFICE.

ARTHUR A. KUPFER AND HERMAN C. KUPFER, OF PROVIDENCE, RHODE ISLAND.

BICYCLE-TIRE.

SPECIFICATION forming part of Letters Patent No. 481,038, dated August 16, 1892.

Application filed March 8, 1892. Serial No. 424,198. (No model.)

*To all whom it may concern:*

Be it known that we, ARTHUR A. KUPFER and HERMAN C. KUPFER, of Providence, in the county of Providence and State of Rhode Island, have invented certain new and useful Improvements in Bicycle-Tires; and we do hereby declare that the following is a full, clear, and exact description of the same, reference being had to the accompanying drawings, forming part of this specification.

This invention has reference to improvements in that class of tires known as "pneumatic tires" and principally used on bicycles.

The object of the invention is to produce a pneumatic tire which shall be durable in construction and convenient in operation.

The further object of the invention is to produce a pneumatic tire provided with means by which the tire proper can be held in a distended position after the same has been punctured.

The invention consists in the new and peculiar construction of the tire and the novel combination therewith of means contained within the tire normally contracted, but expansible in case of emergency, by which the tire may be held in a distended position, as will hereinafter be more fully described, and pointed out in the claims.

Figure 1:
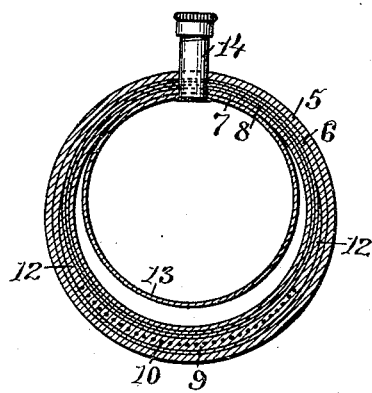
Figure 2:
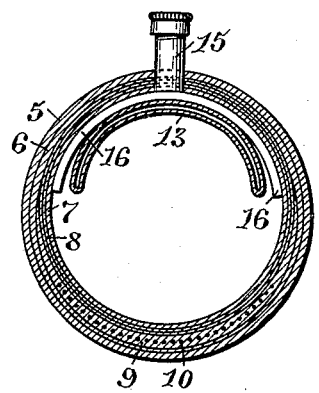
Figure 3:
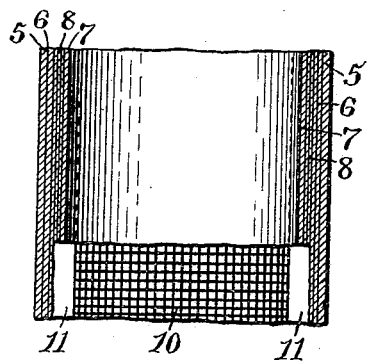

Figure 1 represents a cross-sectional view of the improved tire, taken on a line with the valve through which air is forced into the tube. Fig. 2 represents a cross-sectional view of the tire, taken on a line with the valve for admitting air to the tire. Fig. 3 represents a longitudinal sectional view of a portion of the tire to more clearly indicate the construction of the reinforce-strip.

Similar numbers of reference designate corresponding parts throughout.

The tire is formed of several layers of rubber and cloth vulcanized together in the shape of an endless tube, the layers of cloth preventing the undue expansion of the tire.

In the drawings, 5 indicates the outer layer of rubber, which is secured to the cloth backing 6, the inner layer 7 being secured to the cloth 8. Between the outer and inner layers of the tire, extending for the whole length thereof and located in that portion forming the wearing portion or tread of the tire, is secured the reinforce-strip 9, which is formed of a strip of wire-cloth 10. This strip of wire-cloth is secured between two strips of rubber 11, which are vulcanized together, forming practically one strip of rubber having tapering edges 12 12 and containing the wire-cloth 10. In place of these rubber strips cloth saturated with a suitable cement may be used for inclosing the strip of wire-cloth. At the upper portion of the tire formed as thus described is secured a distensible rubber tube 13, which extends the length of the tire and is of such a size that when fully distended it will lie against the inner surface thereof, the distention of this tube being effected by air forced into the same through the valve 14, which may be of any ordinary construction, and in like manner air is admitted to the tire through any ordinary valve 15, which is also secured to the central upper portion of the tire and is connected with the small transverse tube 16, which is secured in place between the inner upper surface of the tire and the outer surface of the tube 13, the ends of the tube 16 extending downward to direct the inward flow of air to points below the location of the tube 13 when contracted.

The reinforce-strip 9 assists in preventing the longitudinal extension of the tire and forms a firm but elastic bearing for the wearing portion thereof. The supplementary tube 13 is adapted to be expanded in case of damage to the tire, as when the same is punctured, the tube 13 then holding the tire in a distended position. As no wear comes on this inner tube, it can be light and so flexible that should the tire be punctured when the tube 13 is expanded the tube will not be injured, but will be pushed slightly inward. Another advantage to be gained by the use of this supplementary tube is that when it is desired to use the tire as an ordinary cushion, but not expanded to its entire extent, this tube 13 can be partially distended, as indicated in Fig. 1 of the drawings, to serve as a supplementary cushion and prevent the undue wear on the tire or the collapse of the same. The inner tube 13, being secured for its entire length to the upper portion of the tire lining, is entirely out of the way from injury or from friction against the lower portion of the lining when not expanded. By this construction we are able to considerably reduce the necessary thickness of the inner tube and the consequent weight of the same to about one-half the usual weight of the usual expanded inner tubes, which are necessarily thick and strong to resist the frictional wear on the same.

It is not our purpose to claim an inner expanded tube *per se*, as that we know to be old and generally used.

Having thus described our invention, we claim as new and desire to secure by Letters Patent—

1. In a pneumatic tire, the combination therewith of an endless expansible tube secured to the upper inner portion thereof and collapsed against this portion of the tire when not in use and independent means for expanding the same, as described.

2. In a pneumatic tire having an inner expansible tube secured to and normally collapsed against the upper inner portion thereof, the combination therewith of a narrow reinforce-strip formed of crossed wires secured between layers of cloth or rubber and located in the tread of the tire, as described.

3. The combination, with a pneumatic tire provided with a valve and an inner expansible tube 13, secured to and normally collapsed against the upper inner portion of the tire, of the reinforce-strip 9, consisting of the layers 11 11 of cloth or rubber, and the crossed wires 10, secured between said layers, secured in the tread of the tire and extending for but a portion of its circumference, as and for the purpose described.

In witness whereof we have hereunto set our hands.

ARTHUR A. KUPFER.
HERMAN C. KUPFER.

Witnesses:
HENRY J. MILLER,
JOSEPH A. MILLER, Jr.